July 17, 1956 F. HAUBER 2,754,843
SERVOMOTOR ARRANGEMENT, MORE PARTICULARLY FOR REDUCING VALVES
Filed Jan. 2, 1953
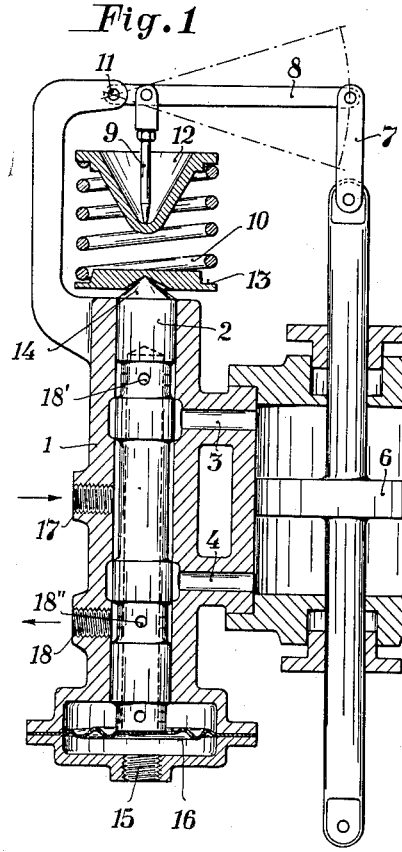
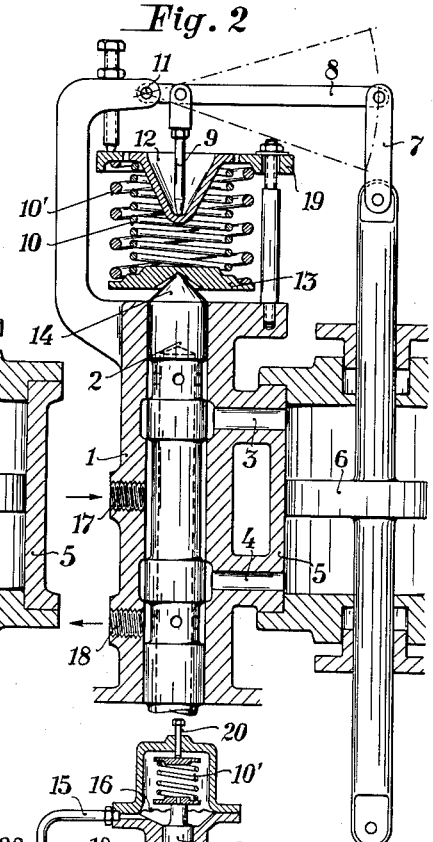
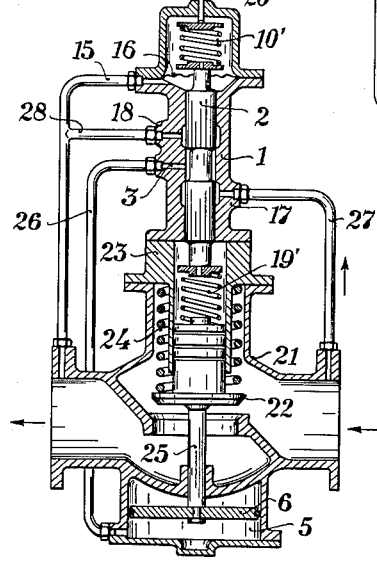
INVENTOR
FRANZ HAUBER
BY
Wenderoth, Lind & Ponack
ATTORNEYS

2,754,843

SERVOMOTOR ARRANGEMENT, MORE PARTICULARLY FOR REDUCING VALVES

Franz Hauber, Vienna, Austria

Application January 2, 1953, Serial No. 329,392

3 Claims. (Cl. 137—492.5)

This invention relates to a servomotor arrangement, more particularly for reducing valves.

Control arrangements for servomotors are known, in which the member controlling the servomotor piston, such as a pilot valve, e. g., a piston valve, or the like, is controlled by rigid connecting means, e. g., levers, arranged between the regulating member and the servomotor, and is disconnected after the control operation has been effected so that as a final result the powerful movement of the servomotor is effected by the less powerful movement of the regulating member through the intermediary of the control member. This rigid returning system requires the regulating member to be displaced always through a distance corresponding to the displacement of the servomotor piston and in no case allows the regulating member to remain at rest. For this reason, diaphragms which may be deflected only slightly from their neutral position cannot be used in such servomotor control arrangements. Moreover, the operation of such rigid returning system involves high friction produced by the pins and guides necessary for the levers. This reduces the sensitivity of control.

The use of springs and diaphragms in regulating devices is known per se, e. g., in the regulation of the servomotor by motive diaphragms receiving an impulse from a relay, and in the use of diaphragms to move control devices for the servomotor piston.

The subject of the present invention is a servomotor arrangement, particularly for the control of reducing valves, in which the control member for the servomotor piston is not connected to a leverage interposed between the servomotor piston and the regulating member and returning the control member to its neutral position, but in which the pilot valve controlling the servomotor piston is floatingly arranged between a diaphragm unilaterally subjected to the pressure to be regulated, and a loading or counterspring, the stressing of which is varied by the movement of the servomotor piston, e. g., through the intermediary of a lever forming an abutment for the loading spring. As a result the pilot valve will be returned automatically to its neutral or closing position of rest after a control operation, by a corresponding variation of the stressing of the spring, which is either increased or reduced. That loading spring may be adjustable. It is of advantage to provide two springs, one of which is suitably an auxiliary spring the stressing of which is varied by the servomotor piston, whereas the other, suitably the main loading spring, is independently adjustable. This control arrangement may act on the valve body of a common globe valve, which is thus converted into a reducing valve. Alternately the control may be assembled into a self-contained unit with such valve.

In the accompanying illustrative drawings,

Fig. 1 shows one embodiment of the invention,

Fig. 2 shows another embodiment comprising two loading springs, and

Fig. 3 shows an example of the servomotor arrangement assembled in a self-contained unit with a reducing valve.

The pilot valve 2 moves in the pilot valve cylinder 1 for the servomotor piston 6, and in its neutral position closes the ducts 3 and 4 leading to the servomotor cylinder 5. The servomotor piston 6 movable in the cylinder 5 is connected by its piston rod and a link 7 to a lever 8 pivotally connected at 11 to the pilot valve cylinder 1. At a point adjacent to said pivot 11 the lever 8 has pivotally connected thereto a thrust rod 9 and a cup 12 as the upper abutment of a loading spring 10 for the pilot valve 2. The lower end of said spring bears against a spring plate 13, which rests on the conical end 14 of an extension of the pilot valve 2. The counterforce is exercised from below on the pilot valve 2 by the pressure to be regulated, which acts on the underside of a diaphragm 16 through a pipe line connected at 15.

When the pressure has been reached which is to be maintained constant, the spring stressing and the pressure on the diaphragm will counterbalance; the pilot valve 2 then closes both ducts 3, 4 and the servomotor piston 6 is at rest. A rise of pressure below the diaphragm 16, corresponding to an increase of the pressure to be regulated, will lift the pilot valve 2 and opens the duct 3 for the pressure fluid flowing in at 17. Thereby the servomotor piston 6 is depressed, whereas the pressure fluid below the piston is discharged through duct 4 and the open discharge line 18. The downwardly moving piston 6 may close, e. g., a globe valve connected thereto and effective as a reducing valve, and at the same time increases by means of the rod 9 the pressure on the spring 10, to increase the stressing thereof and to depress the pilot valve 2, which thus closes the ducts 3, 4. As a result the piston 6 will remain in its new position and maintain the globe valve throttled as mentioned above. As the pressure drops below the diaphragm 16, the regulating operation is reversed: The pilot valve 2 is depressed by the spring 10, the pressure fluid flows through ducts 17 and 4 below the piston 6 to lift the same, and the pressure fluid above the piston 6 is discharged through ducts 3, 18', 18'', 18. The loading spring 10 is partially stress-relieved by the rising piston 6 so that the pressure on the diaphragm 16 is enabled to return the pilot valve 2 into its neutral position closing the ducts 3 and 4. In every case the pilot valve 2 is resiliently returned.

The arrangement has the advantage that the diaphragm 16 is deflected only during the control operation and only to a very small extent, if such deflection is necessary at all for the temporary opening of the pilot valve 2. Only this mode of operation enables the trouble-free use of a diaphragm. Moreover, the pilot valve is moved without levers or pins acting directly thereon, so that the pilot valve 2 can freely float in its cylinder. Owing to its centric action the loading spring 10 cannot exercise lateral pressure on the pilot valve 2. Instead of one compression spring, several springs may be used, and the compression spring or springs may be replaced by an appropriate arrangement of tension springs.

The loading spring 10 may be adjustable, to enable its correct adjustment relative to the system described. It is of special advantage, however, to load the diaphragm 16 by two springs, one of which is adjustable whereas the stressing of the second of said springs is variable by the movement of the servomotor piston 6. It is further of advantage to use the adjustable spring as the main loading spring and the second spring as an auxiliary spring.

Fig. 2 shows an embodiment of such device. Two compression springs 10, 10' are arranged one in the other and jointly act on the pilot valve 2, e. g., through the spring plate 13. Of these springs, the spring 10 is subjected to the action of the servomotor piston 6 through the intermediary of the lever 8. Consequently its stressing will vary during the control operation. The second spring 10' is manually adjustable, e. g., by the vertical adjustment of an upper thrust ring 19 by means of screws. If the adjustable spring 10' is the stronger, main loading spring, as shown in the drawing, and the spring 10 is the less powerful auxiliary loading spring, the control operation will be facilitated because relatively small forces are effective and must be overcome.

The apparatus described is suitable for the control of all processes in which pressures are to be maintained constant. For this reason it is applicable more particularly for the control of the throttling member of reducing valves. To that end it is sufficient to connect the piston rod of the servomotor piston with the valve body of the reducing valve; then the valve body will perform the same movements as the servomotor piston. Alternatively the control device described may be assembled in a self-contained unit with a reducing valve.

An example of the type mentioned last is shown in Fig. 3. Here the pilot valve 2 is subjected to the influence of two springs 10' and 19', and of the pressure which is to be regulated and acts on the diaphragm 16 from below. As a main spring the spring 10' opposes the pressure on the diaphragm; it can be adjusted, e. g., by means of the screw 20. As an auxiliary spring the spring 19' acts on the diaphragm in the same direction as the pressure admitted thereto. As the stressing of the spring 10 in the previously described embodiment, the stressing of the spring 19' is varied during a control operation. Thus the spring 10' counterbalances the pressure on the diaphragm and the force of the spring 19'.

The pilot valve 2, the diaphragm 16 and the springs 10', 19' are arranged over the valve 21. The spring 19' abuts on the valve body 22, which is movable in the guide 23 and subject to the influence of a closing spring 24. The servomotor cylinder 5 is arranged below the valve 21 and its piston 6 acts by means of a push rod 25 on the valve body 22. In the embodiment shown the cylinder 5 is arranged for admitting pressure fluid only at one side, through the line 26, which receives the unreduced pressure from line 27 through pilot valve 2, whereas the pressure fluid can discharge through line 28 into the main line behind the valve 21, where the reduced pressure prevails.

When the desired low pressure has been reached, the valve body 22 is lifted correspondingly, the diaphragm is in its neutral position and the pilot valve 2 closes the inlet line 3 to the servomotor cylinder and the discharge line 28. When the reduced pressure drops below the desired value, the spring 10' will overcome the pressure of the diaphragm 16 and spring 19', and the pilot valve 2 will subside to connect lines 27 and 3. Thereby the pressure fluid is conducted below the servomotor piston 6, which rises and increases the opening of valve body 22. The rising volve body increases the stressing of spring 19' until the force thereof, together with the pressure on the diaphragm, overcomes the counterforce of spring 10', whereby the pilot valve 2 is returned upwardly into its position of rest, in which it shuts the lines 27 and 3 from each other. The rise of the piston 6 is terminated before the movement of the valve body 22 has caused a change in the low-pressure part.

This return motion is also accomplished without the use of levers and pins, which would produce friction. Also in this case the pilot valve is moved out of its neutral position only during a pressure change and for a small distance, and will return into its neutral position after the completion of the control action and readjustment of the desired low-pressure value. For this reason the diaphragm will perform only slight deflections out of its neutral position.

I claim:

1. A servomotor arrangement comprising in a self-contained unit the combination of a reducing valve having a valve body, a servomotor piston below said reducing valve, a pilot valve controlling the admission of pressure fluid to said servomotor piston, a diaphragm connected to said pilot valve, means to admit pressure to said diaphragm, which is arranged to transmit the force of said pressure to said pilot valve, loading spring means connected to said pilot valve and arranged to oppose the force transmitted thereto by said diaphragm, said loading spring means comprising a first loading spring arranged to oppose the force transmitted to said pilot valve by said diaphragm and a second loading spring weaker than said first loading spring and inserted between said pilot valve and said reducing valve body and arranged to act on the pilot valve in the same direction as said force transmitted thereto by said diaphragm, said pilot valve, diaphragm and first spring being arranged above the reducing valve, and setting means in engagement with said first loading spring and operable to impart to the same a stressing sufficient to counterbalance the force transmitted to said pilot valve in the direction of the force transmitted thereto by said diaphragm when a predetermined pressure is admitted to said diaphragm, said reducing valve body constituting transmitting means interconnecting said servomotor piston and said second loading spring to vary the stressing thereof in dependence of a movement of the servomotor piston caused by an admission of pressure fluid thereto by an operation of said pilot valve caused by a change in the pressure admitted to said diaphragm, the arrangement being such as to vary the resultant stressing of said loading spring means in the same sense in which the pressure admitted to the diaphragm has changed and thus to return the pilot valve into its initial position after each operation thereof caused by such pressure change.

2. A servomotor arrangement as set forth in claim 1, in which the pilot valve is arranged to control the admission of pressure fluid only to one side of said servomotor piston and which comprises a spring connected to said valve body and arranged to act thereon in the valve closing sense.

3. A servomotor arrangement comprising in a unit the combination of a reducing valve having a valve body, a servomotor piston below said reducing valve, a pilot valve controlling the admission of pressure fluid from the high pressure side of the reducing valve to said servomotor piston and the admission of pressure fluid from the servomotor piston to the low pressure side of said reducing valve, means to admit said pressure fluid to said servomotor piston through said pilot valve, means to admit pressure from the servomotor piston to the low pressure side of the reducing valve through the pilot valve, a diaphragm connected to said pilot valve, means to admit pressure from the low pressure side of said reducing valve to said diaphragm, the diaphragm being arranged to transmit the force of said pressure to said pilot valve, loading spring means connected to said pilot valve and arranged to oppose the force transmitted thereto by said diaphragm, said loading spring means comprising a first loading spring arranged to oppose the force transmitted to said pilot valve by said diaphragm and a second loading spring weaker than the said first loading spring and inserted between said pilot valve and said reducing valve body and arranged to act on the pilot valve in the same direction as the force transmitted thereto by the said diaphragm, said pilot valve diaphragm and first spring being arranged above the reducing valve, setting means in engagement with said first loading spring and operable to impart to the same a stressing sufficient to counterbalance the force transmitted to said pilot valve in the direction of the force transmitted thereto by said diaphragm when a predetermined pressure has been admitted to said diaphragm from the low pressure side of said reducing valve, said reducing valve body constituting transmitting means interconnecting said servomotor piston and said second loading spring to vary the stressing thereof in dependence of a movement of the servomotor piston caused by an admission of pressure fluid thereto by an operation of said pilot valve caused by change in the pressure admitted to said diaphragm, the arrangement being such as to vary the resultant stressing of said loading spring means in the same sense in which the pressure admitted to the diaphragm has changed and thus to return the pilot valve to its initial position after each operation thereof caused by such pressure change, whereby the reducing valve can be controlled to keep the pressure on the low pressure side of the valve constant at said predetermined pressure.

References Cited in the file of this patent

UNITED STATES PATENTS

| | | |
|---|---|---|
| 2,376,671 | Dodson | May 22, 1945 |
| 2,411,748 | Kelly | Nov. 26, 1946 |
| 2,462,580 | Watson | Feb. 22, 1949 |
| 2,558,506 | Annin | June 26, 1951 |
| 2,612,872 | Strayer | Oct. 7, 1952 |

FOREIGN PATENTS

| | | |
|---|---|---|
| 604,798 | Germany | Oct. 30, 1934 |
| 173,135 | Austria | Jan. 26, 1953 |